United States Patent
Pant et al.

(10) Patent No.: US 10,712,807 B2
(45) Date of Patent: Jul. 14, 2020

(54) METHODS AND APPARATUS FOR SAVING ALWAYS ON (AON) ROUTING OF SIGNALS ACROSS CHIPS

(71) Applicant: QUALCOMM Incorporated, San Diego, CA (US)

(72) Inventors: Harshat Pant, San Diego, CA (US); Rajeev Jain, San Diego, CA (US); Byron Glenn Murphy, San Diego, CA (US); Lipeng Cao, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 15/942,207

(22) Filed: Mar. 30, 2018

(65) Prior Publication Data

US 2019/0302876 A1 Oct. 3, 2019

(51) Int. Cl.
*G06F 1/26* (2006.01)
*G06F 1/3287* (2019.01)
*G06F 1/3203* (2019.01)

(52) U.S. Cl.
CPC .......... *G06F 1/3287* (2013.01); *G06F 1/3203* (2013.01)

(58) Field of Classification Search
CPC .................................................. G06F 1/3287
USPC ....................................................... 713/323
See application file for complete search history.

(56) References Cited

U.S. PATENT DOCUMENTS

| | | | |
|---|---|---|---|
| 6,362,669 B1* | 3/2002 | Zhou | H03K 3/033 327/143 |
| 7,015,744 B1* | 3/2006 | Holloway | G05F 3/262 323/315 |
| 7,369,815 B2 | 5/2008 | Kang et al. | |
| 7,839,016 B2 | 11/2010 | Wang et al. | |
| 8,022,727 B2 | 9/2011 | Koutsoures | |
| 8,766,707 B1* | 7/2014 | Younger | G06F 1/3287 327/534 |
| 8,892,930 B2 | 11/2014 | Yeh et al. | |
| 9,785,211 B2 | 10/2017 | Koob et al. | |
| 9,973,187 B1* | 5/2018 | Pant | H03K 17/223 |
| 10,003,255 B1* | 6/2018 | Jull | H02M 1/44 |
| 2005/0064829 A1* | 3/2005 | Kang | H04W 52/028 455/127.1 |
| 2009/0153210 A1* | 6/2009 | Wang | G06F 1/32 327/198 |
| 2010/0031073 A1* | 2/2010 | Yeh | G06F 1/3203 713/324 |
| 2010/0295595 A1* | 11/2010 | Koutsoures | H03K 19/1731 327/309 |

(Continued)

*Primary Examiner* — Volvick Derose
(74) *Attorney, Agent, or Firm* — Loza & Loza, LLP

(57) ABSTRACT

Aspects of the disclosure are directed to saving always on (AON) routing of signals across chips, the disclosure includes turning ON a first power signal in a system on a chip (SOC) when a Power ON Reset (PoR) signal is asserted and a clamp control signal is asserted; turning ON a second power signal in the SOC after the first power signal is turned ON; de-asserting the PoR signal after the second power signal is turned ON; latching a logic signal with a LOW clamp keeper cell if the logic signal is at a LOW logic level or with a HIGH clamp keeper cell if the signal is at a HIGH logic level; and de-asserting the second power signal while a first section of the SOC routes the logic signal through a second section of the SOC.

30 Claims, 6 Drawing Sheets

(56) References Cited

U.S. PATENT DOCUMENTS

| | | | | |
|---|---|---|---|---|
| 2012/0198408 | A1* | 8/2012 | Chopra | G06F 17/504 716/127 |
| 2012/0216089 | A1* | 8/2012 | Chen | G01R 31/3008 714/727 |
| 2013/0141988 | A1* | 6/2013 | McCombs | G11C 7/1051 365/189.05 |
| 2014/0002152 | A1* | 1/2014 | Terrovitis | H03L 7/0893 327/157 |
| 2015/0362980 | A1* | 12/2015 | Tripathi | G06F 1/3287 713/324 |
| 2016/0239060 | A1* | 8/2016 | Koob | G06F 1/3237 |
| 2018/0164376 | A1* | 6/2018 | Ge | G01R 31/31721 |

* cited by examiner

METHODS AND APPARATUS FOR SAVING ALWAYS ON (AON) ROUTING OF SIGNALS ACROSS CHIPS

TECHNICAL FIELD

This disclosure relates generally to the field of techniques and circuits to save costly always on (AON) routing of signals across chips for applications where the receiver of the signals needs to be always on.

BACKGROUND

A system on a chip (SOC) may include a plurality of modules which perform various functions. For example, the SOC may include a general purpose processor, a signal processor, a graphics processor, a baseband processor, etc. The SOC may also operate with a variety of SOC power modes. For example, the SOC may include a module which manages the SOC power modes. One module, a distributed adaptive power multiplexer (APM), may be used to manage SOC power modes. The APM may include an APM controller to send control signals to other modules. Hence, saving always on (AON) routing on the SOC is needed.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides saving always on (AON) routing of signals across chips. Accordingly, a method for saving always on (AON) routing of signals across chips, the method including turning ON a first power signal in a system on a chip (SOC) when a Power ON Reset (PoR) signal is asserted and a clamp control signal is asserted; turning ON a second power signal in the SOC after the first power signal is turned ON, wherein the second power signal is placed in an asserted state; de-asserting the PoR signal after the second power signal is turned ON; latching a logic signal with a LOW clamp keeper cell if the logic signal is at a LOW logic level or with a HIGH clamp keeper cell if the signal is at a HIGH logic level; and de-asserting the second power signal while a first section of the SOC routes the logic signal through a second section of the SOC, wherein the second power signal is placed in a de-asserted state.

In one example the first section of the SOC is an always ON section. In one example, the second section of the SOC is a transient ON section of the SOC. In one example, the de-asserting the PoR signal is implemented after a third power signal is turned ON, wherein the third power signal is different from the second power signal. In one example, the third power signal is used in a first transient ON section of the SOC. In one example, the second power signal is used in a second transient ON section of the SOC and wherein the second transient ON section is different from the first transient ON section. In one example, the first power signal is used in an always ON section of the SOC.

In one example, the method further includes generating the PoR signal based on the clamp control signal. In one example, the method further includes generating the PoR signal based on a global reset signal. In one example, the method further includes generating the PoR signal based on a constant LOW logic level signal. In one example, the method further includes using the clamp control signal to latch the logic signal. In one example, the LOW logic level is preserved while the second power signal changes from the asserted state to the de-asserted state. In one example, the HIGH logic level is preserved while the second power signal changes from the asserted state to the de-asserted state.

Another aspect of the disclosure provides a clamp keeper system, including a clamp keeper cell, wherein the clamp keeper cell includes a clamp keep latch and a logic function, wherein the clamp keep latch is coupled to the logic function; and a reset signal generation circuit coupled to the clamp keeper cell for generating a Power ON Reset (PoR) signal, wherein the PoR signal is a first input to the logic function. In one example, the clamp keep latch includes an input for inputting a clamp control signal. In one example, the clamp keep latch includes an output coupled to a second input to the logic function.

In one example, the reset signal generation circuit includes a latch; a clock module for generating a clock signal for inputting to the latch, wherein the clock signal is based on the clamp control signal; an inversion module for generating an internal latch reset signal for inputting to the latch; a tie low module for generating a constant LOW logic level for inputting to the latch; and a buffer coupled to an output of the latch, wherein the buffer outputs the Power ON Reset (PoR) signal.

In one example, the logic function is an OR logic function. In one example, an output of the clamp keeper cell is at a logic level of HIGH at an initialization interval. In one example, the logic function is a bubbled AND logic function. In one example, an output of the clamp keeper cell is at a logic level of LOW at an initialization interval.

Another aspect of the disclosure provides an apparatus for saving always on (AON) routing of signals across chips, the apparatus including means for turning ON a first power signal in a system on a chip (SOC) when a Power ON Reset (PoR) signal is asserted and a clamp control signal is asserted; means for turning ON a second power signal in the SOC after the first power signal is turned ON, wherein the second power signal is placed in an asserted state; means for de-asserting the PoR signal after the second power signal is turned ON; means for latching a logic signal with a LOW clamp keeper cell if the logic signal is at a LOW logic level or with a HIGH clamp keeper cell if the signal is at a HIGH logic level; and means for de-asserting the second power signal while a first section of the SOC routes the logic signal through a second section of the SOC, wherein the second power signal is placed in a de-asserted state.

In one example, the first section of the SOC is an always ON section, and the second section of the SOC is a transient ON section of the SOC. In one example, the apparatus further includes means for turning ON a third power signal and wherein de-asserting the PoR signal is implemented after the third power signal is turned ON. In one example, the apparatus further includes means for generating the PoR signal based on the clamp control signal. In one example, the means for generating the PoR signal also uses a global reset signal and a constant LOW logic level signal to generate the PoR signal.

In one example, the apparatus further includes means for using the clamp control signal to latch the logic signal. In one example, the apparatus further includes means for preserving the LOW logic level while the second power signal changes from the asserted state to the de-asserted state. In one example, the apparatus further includes means for preserving the HIGH logic level while the second power signal changes from the asserted state to the de-asserted state.

Another aspect of the disclosure provides a computer-readable medium storing computer executable code, operable on a device including at least one processor and at least one memory coupled to the at least one processor, wherein the at least one processor is configured to implement saving always on (AON) routing of signals across chips, the computer executable code including instructions for causing a computer to turn ON a first power signal in a system on a chip (SOC) when a Power ON Reset (PoR) signal is asserted and a clamp control signal is asserted; instructions for causing the computer to turn ON a second power signal in the SOC after the first power signal is turned ON, wherein the second power signal is placed in an asserted state; instructions for causing the computer to de-assert the PoR signal after the second power signal is turned ON; instructions for causing the computer to latch a logic signal with a LOW clamp keeper cell if the logic signal is at a LOW logic level or with a HIGH clamp keeper cell if the signal is at a HIGH logic level; and instructions for causing the computer to de-assert the second power signal while a first section of the SOC routes the logic signal through a second section of the SOC, wherein the second power signal is placed in a de-asserted state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
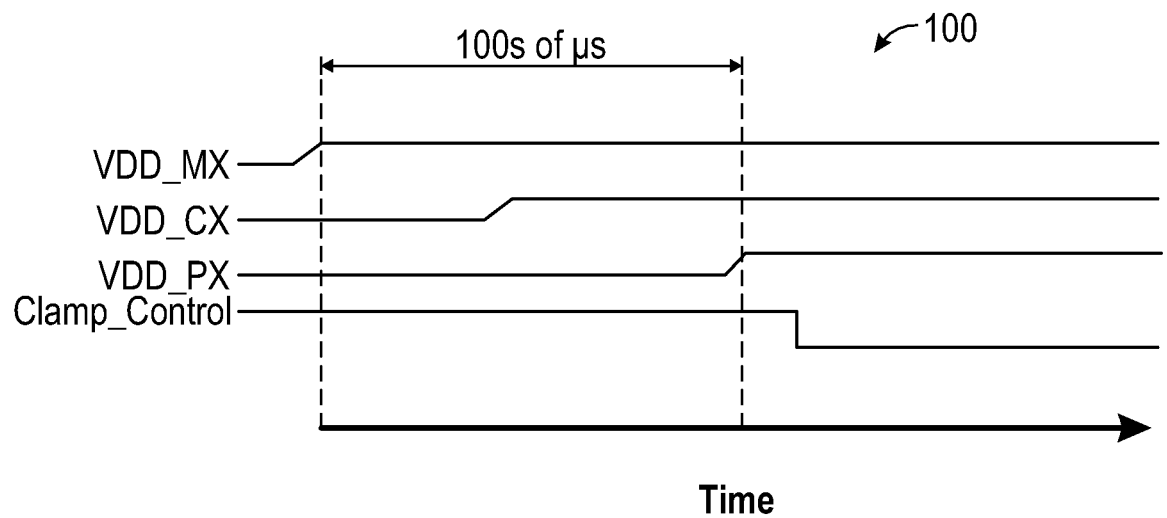
FIG. 1 illustrates an example system on a chip (SOC) power rail initialization sequence.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A system on a chip (SOC), or chip, may include a distributed adaptive power multiplexer (APM) for managing SOC power modes. The APM may include an APM controller to send control signals to other modules. The SOC may also include a plurality of sections, each with a separate dc power supply or power rail. For example, the SOC may include a first section, for example, an always ON section, (e.g., an MX section) with a first power rail (e.g., an MX power rail). The SOC may also include a second section, for example, a transient ON section, (e.g., a CX section), which may be turned ON and OFF, with a second power rail (e.g., a CX power rail), etc.

The SOC may be partitioned such that the first section (e.g., always ON section) has limited chip area, routing and dc power resources compared to the second section (e.g., transient ON section), which may have substantially more chip area, routing and dc power resources. The management of SOC power modes may include a sleep mode where the second section (e.g., transient ON section) dc power on the second power rail is collapsed, i.e., turned OFF, to maximize battery life by reducing the SOC idle power. In one example, the SOC idle power is a state where the SOC is idle and is brought down to the lowest possible DC power consumption state.

In one example, the APM controller may drive many control signals on the SOC. In particular, it may be necessary for the APM controller to manage power up operation in a stable manner as various power rails are turned ON. For example, in sleep mode, the first power rail (MX power rail) may be enabled first, so the APM controller and its associated control signals are supplied from the first power rail. This allows the APM controller and associated control signals to be enabled first.

There may be two types of control signals in the always ON section: dynamic signals (which toggle through many states as a function of time) and pseudo-static signals (which are mostly quiescent configuration signals). Upon wakeup from a sleep mode, pseudo-static signals need to maintain their previous state when sleep mode was initiated. Thus, the pseudo-static signal state must be preserved during sleep mode and upon wakeup. Hence, the APM controller and its associated pseudo-static signals need to be energized from the first power rail (MX power rail).

However, the first power rail for the APM signals consumes limited SOC resources on the always ON section (e.g., chip area, routing and dc power) and leads to significant power grid (PG) pin routing overhead. Thus, an alternative APM architecture is disclosed herein to minimize usage of limited SOC resources in the always ON section.

FIG. 1 illustrates an example system on a chip (SOC) power rail initialization sequence 100. In this example, a plurality of power signals is shown as a function of time on a horizontal axis. For example, a first power signal, e.g., a first power rail drain voltage, VDD_MX, is turned ON. In one example, the first power signal is turned ON, prior to other power signals. In one example, the first power signal is sent to an always ON section of the SOC (e.g., MX section). Next, a second power signal, e.g., a second power rail drain voltage, VDD_CX, is turned ON. In one example, the second power signal is turned ON after the first power signal is turned ON as shown in FIG. 1. In one example, the second power signal is sent to a first transient ON section of the SOC (e.g., CX section). Next, a third power signal, e.g., a third power rail drain voltage, VDD_PX, is turned ON. In one example, the third power signal is turned ON after the second power signal is turned ON as shown in FIG. 1. In one example, the third power signal is sent to a second transient ON section of the SOC (e.g., PX section). Next, a fourth power signal, e.g., a clamp control signal, CLAMP_CONTROL is turned OFF. In one example, the fourth power signal is turned OFF after the third power signal is turned ON as shown in FIG. 1.

In one example, an adaptive power multiplexer (APM) receives the first power signal so that it is part of the always ON section of the SOC (e.g., MX section). In one example, the APM receives the first power signal to ensure a stable power sequencing operation. The placement of the APM in the always ON section of the SOC may result significant pin routing overhead in the always ON section. Routing of APM control signals in the always ON section uses buffers for both transmit and receive functions which may consume limited dc power and area resources in the always ON section.

In one example, a SOC design routes a subset of APM control signals in the transient ON section. For example, the subset of APM control signals routed in the transient ON section may be pseudo-static control signals (e.g., mostly quiescent configuration signals). In one example, APM control signals routed in the transient ON section may use clamp keeper cells prior to routing in the APM itself. Clamp keeper cells may be used to maintain pre-determined state levels during actual APM switching events. For example, a clamp control signal may assert (e.g., transition to a HIGH logic level) whenever the transient ON section is in a power collapse state or in a retention state or during a power up state. For example, the clamp control signal may be a VDD_CX_clamp_mem signal. In one example, the SOC design may use hard macro cells which surround APM tiles to convert signals from the always ON section to the transient ON section and vice versa. Clamp keeper cells may start in an unknown state at a Power ON Reset (POR) state since a latch may be closed at the start of the POR state.

Figure 2:
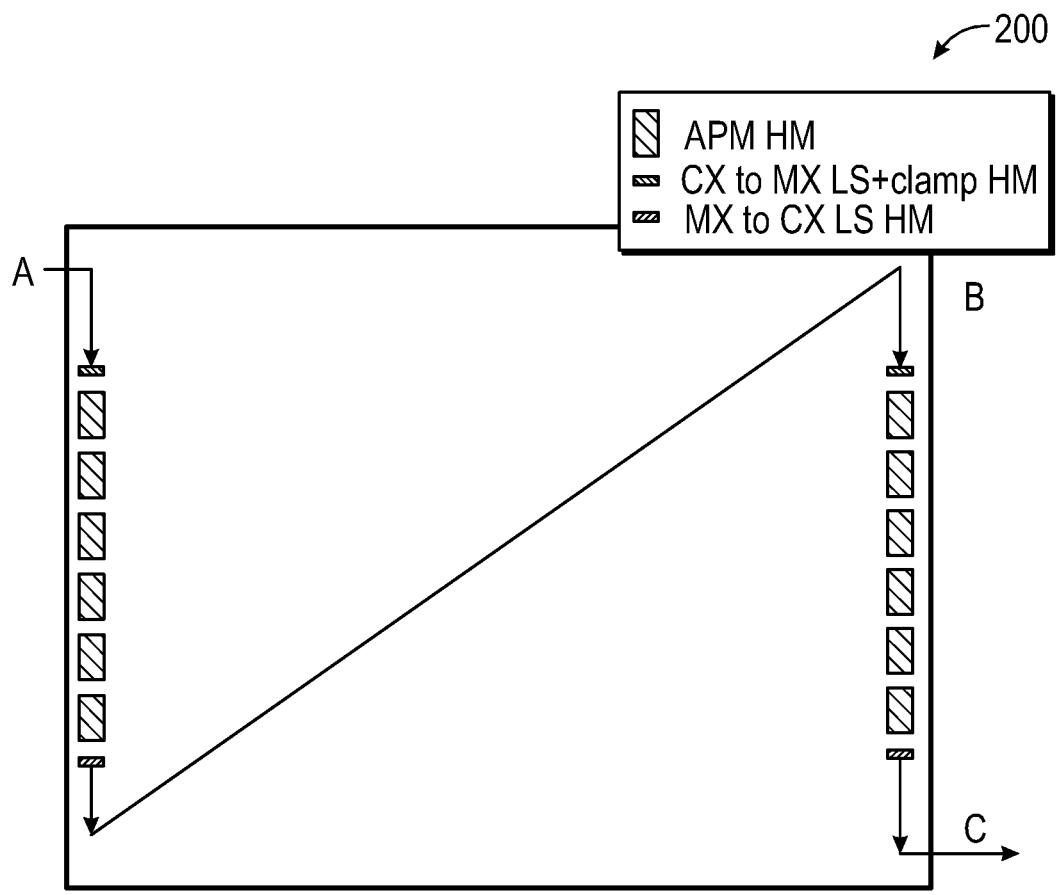
FIG. 2 illustrates an example routing layout of pseudo-static signals in a system on a chip (SOC).

FIG. 2 illustrates an example routing layout 200 of pseudo-static signals in a system on a chip (SOC). For example, a signal from the always ON section enters the example routing layout 200 on the upper left border at A, transits a first CX to MX hard macro (HM) cell, transits a first plurality of APM hard macro cells, transits a first MX to CX HM cell, routes across the example routing layout to the upper right portion (indicated as B), transits a second CX to MX HM cell, transits a second plurality of APM hard macro cells, transits a second MX to CX HM cell, and exits the example routing layout on the lower right border at C.

Figure 3:
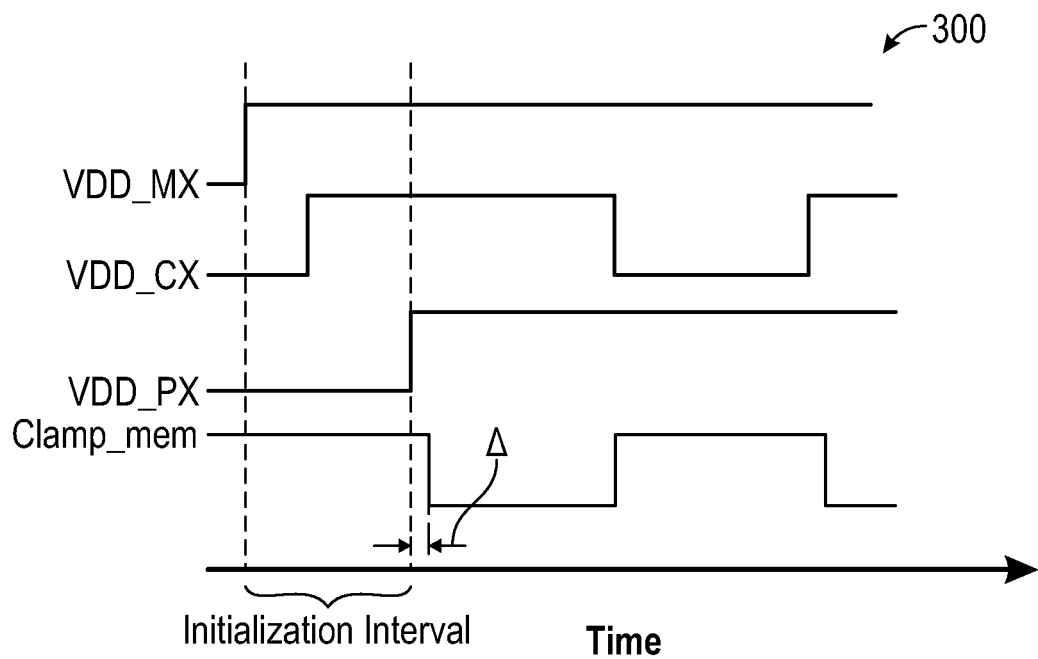
FIG. 3 illustrates an example system on a chip (SOC) power rail initialization sequence with a clamp control signal.

FIG. 3 illustrates an example system on a chip (SOC) power rail initialization sequence 300 with a clamp control signal. In this example, a plurality of power signals is shown as a function of time on a horizontal axis. For example, a first power signal, e.g., a first power rail drain voltage, VDD_MX, is turned ON. In the example shown in FIG. 3, the first power signal is turned ON, prior to other power signals. The first power signal is sent to an always ON section of the SOC (e.g., MX section). Next, a second power signal (e.g., a second power rail drain voltage, VDD_CX) is turned ON. As shown in the example of FIG. 3, the second power signal is initially turned ON after the first power signal is turned ON. In one example, the second power signal may be toggled OFF and ON after initial turn ON. In one example, the second power signal is sent to a first transient ON section of the SOC (e.g., CX section).

Next, a third power signal, e.g., a third power rail drain voltage, VDD_PX, is turned ON. As shown in the example of FIG. 3, the third power signal is turned ON after the second power signal is initially turned ON. In one example, the third power signal is sent to a second transient ON section of the SOC (e.g., PX section). Next, a fourth power signal, e.g., a clamp control signal (clamp_mem) is toggled ON whenever one or more of the first power signal, the second power signal or the third power signal is turned OFF.

In one example, an initialization interval is a time duration with all power signals transitioning from OFF to ON. For example, at initial power up, the clamp control signal is toggled ON during the initialization interval as the first power signal is turned ON, the second power signal is initially turned ON and the third power signal is turned ON. For example, the initialization interval starts when the first power signal (e.g., VDD_MX) turns ON and the initialization interval ends when the third power signal (e.g., VDD_PX) turns ON. In addition, the initialization interval may include a small timing tolerance which adds to its time duration to account for intrinsic switching time delays for state transitions of other signals, e.g., clamp control signal. Hence, as shown in FIG. 3, there's a small time duration Δ between when the third power signal is turned ON and the clamp control signal, Clamp_mem, is toggled OFF. In one example, the small time duration Δ is the time between the third power signal (e.g., VDD_PX) coming up and the clamp control signal deasserting.

Next the clamp control signal is toggled OFF while the first power signal, second power signal and third power signal remain ON until the second power signal is toggled OFF. When the second power signal is toggled OFF, the clamp control signal is then toggled ON again as shown in FIG. 3. In one example, the clamp keeper cells should initialize in a known default state (e.g., LOW or HIGH logic level), depending on the specific signal, but prior to actual APM switching. In one example, the clamp keeper cells maintain pre-determined state levels prior to actual APM switching.

Figure 4:
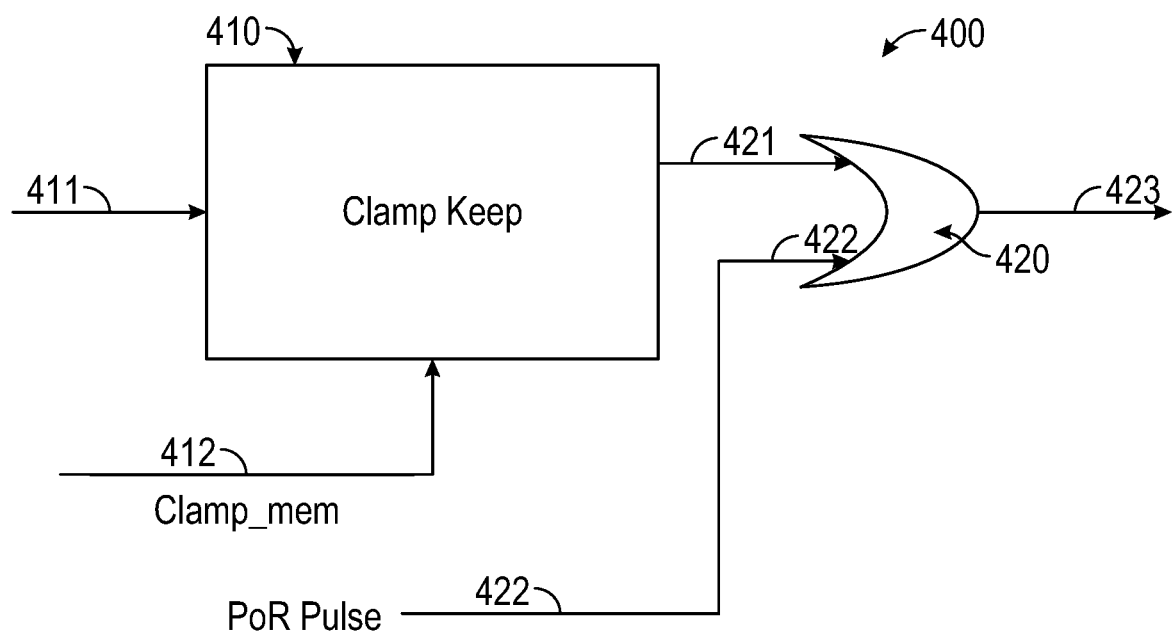
FIG. 4 illustrates an example of a first clamp keeper cell for a pre-determined logic level of HIGH.

FIG. 4 illustrates an example of a first clamp keeper cell 400 for a pre-determined logic level of HIGH. In one example, the first clamp keeper cell 400 includes a clamp keep latch 410 and an OR logic function 420. The clamp keep latch 410 has a first input 411, a second input for inputting a clamp control signal (e.g., clamp mem) 412, and an output 421. In one example, the clamp keep latch maintains the logic level at the first input 411 when the clamp control signal is asserted (i.e., set to a HIGH logic level). In one example, the OR logic function 420 may be implemented by a combination of logic gates such as AND, OR, NAND, NOR, XOR, NOT, etc. In one example, the output 421 serves as a first input to the OR logic function 420 and a Power ON Reset (PoR) pulse signal 422 serves as a second input to the OR logic function 420. The OR logic function 420 includes a first clamp keeper cell output 423. In one example, the first clamp keeper cell output 423 is at a logic level of HIGH at the initialization interval and variable thereafter.

Figure 5:
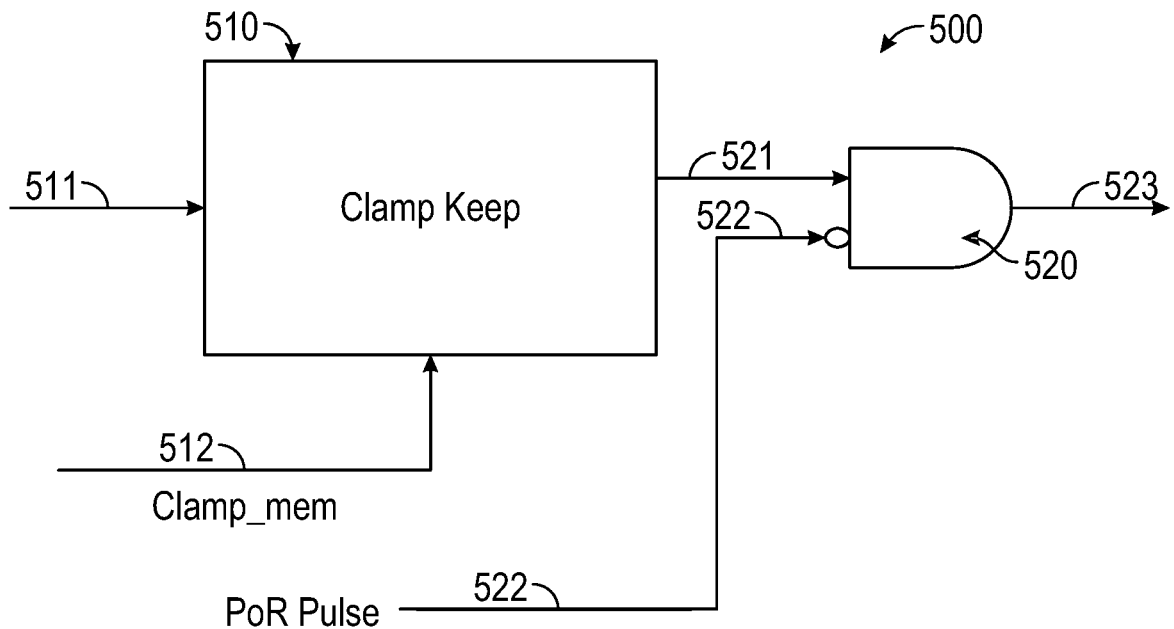
FIG. 5 illustrates an example of a second clamp keeper cell for a pre-determined logic level of LOW.

FIG. 5 illustrates an example of a second clamp keeper cell 500 for a pre-determined logic level of LOW. The second clamp keeper cell includes a clamp keep latch 510 and a bubbled AND logic function 520. The clamp keep latch 510 has a first input 511, a second input for inputting a clamp control signal (e.g., clamp mem) 512, and an output 521. In one example, the clamp keep latch 510 maintains the logic level at the first input 511 when the clamp control signal 512 is asserted (i.e., set to a HIGH logic level). In one example, the bubbled AND logic function 520 may be implemented by a combination of logic gates such as AND, OR, NAND, NOR, XOR, NOT, etc. In one example, the output 521 serves as a first input to the bubbled AND logic function 520 and a Power ON Reset (PoR) pulse signal 522 serves as a second input to the bubbled AND logic function 520. The bubbled AND logic function 520 has a second clamp keeper cell output 523. In one example, the second clamp keeper cell output 523 is at a logic level of LOW at the initialization interval and variable thereafter.

Figure 6:
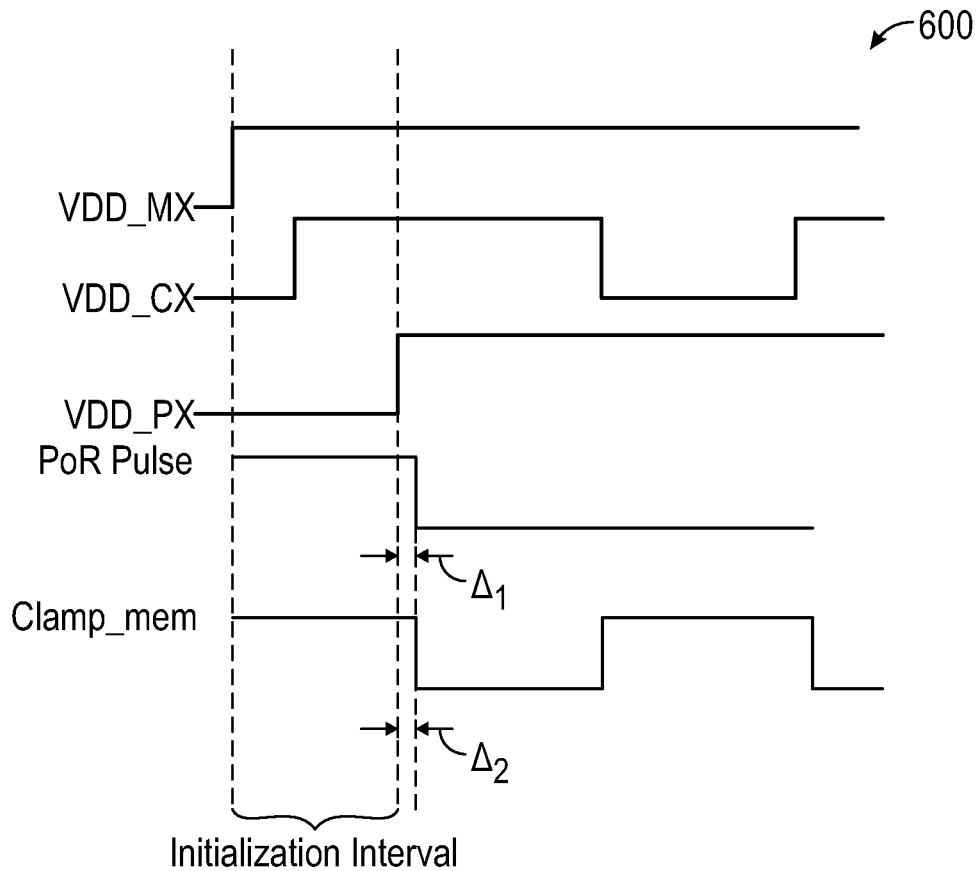
FIG. 6 illustrates an example system on a chip (SOC) power rail initialization sequence with a clamp control signal and a Power ON Reset (PoR) signal.

FIG. 6 illustrates an example system on a chip (SOC) power rail initialization sequence 600 with a clamp control signal and a Power ON Reset (PoR) signal. The example SOC power rail initialization sequence 600 is similar to the SOC power rail initialization sequence 300 described in FIG. 3 with the addition of the PoR signal. In one example, the PoR signal is asserted (e.g., set to a HIGH logic level) only during the initialization interval. In one example, the PoR signal serves as an input to the first clamp keeper cell 400 shown in FIG. 4 and to the second clamp keeper cell 500 shown in FIG. 5.

As stated in FIG. 3, an initialization interval is a time duration with all power signals transitioning from OFF to ON. For example, the initialization interval starts when the first power signal (e.g., VDD_MX) turns ON and the initialization interval ends when the third power signal (e.g. VDD_PX) turns ON. In addition, the initialization interval may include a small timing tolerance which adds to its time duration to account for intrinsic switching time delays for state transitions of other signals, e.g., clamp control signal and a Power ON Reset (PoR) signal. Hence, as shown in FIG. 6, there's a small time duration $\Delta_1$ or $\Delta_2$ between when the third power signal is turned ON and the POR signal is turned OFF or the clamp control signal, Clamp_mem, is toggled OFF, respectively. In one example, $\Delta_1$ and $\Delta_2$ are equal. In one example, the clamp control signal, Clamp_mem, deasserts a first delay after the third power signal (e.g., VDD_PX) at start up or after the second power signal (e.g., a second power rail drain voltage, VDD_CX) during subsequent power down, powers up. In one example, the Power ON Reset (PoR) signal adds a second delay to deassert some time after the clamp control signal, Clamp_mem, has deasserted, to avoid a race condition and ensure output stability.

Figure 7:
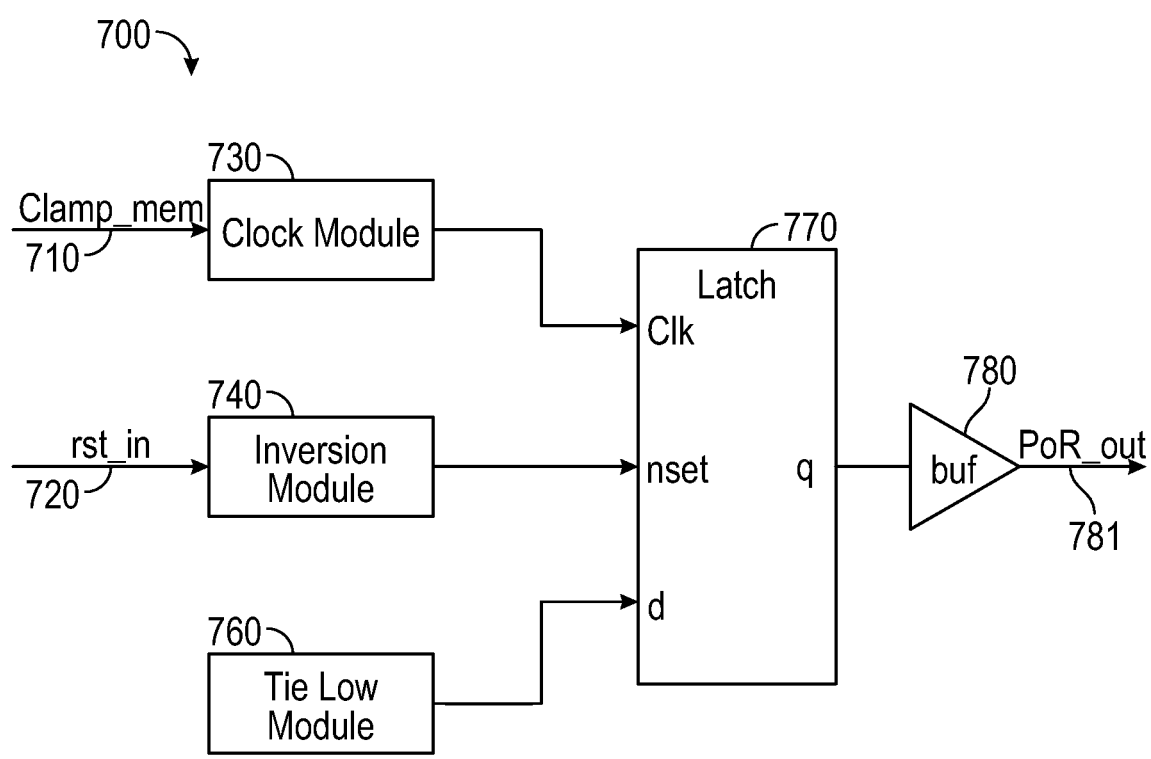
FIG. 7 illustrates a first example reset signal generation circuit in a system on a chip (SOC).

FIG. 7 illustrates a first example reset signal generation circuit 700 in a system on a chip (SOC). In one example, the SOC generates only a clamp control signal, and a separate reset signal generation circuit is needed to generate a PoR signal from the clamp control signal. In one example, the clamp control signal (e.g., clamp_mem) 710 is sent to a clock module 730 to generate a clock signal (labeled as clk) as input to a latch 770. In addition, a tie low module 760 serves as a data input to latch 770. In one example, the tie low module 760 generates a constant LOW logic level at its output which is inputted to the latch 770. In one example, a global reset signal (e.g., rst_in) 720 is inputted to an inversion module 740 to generate an internal latch reset signal nset to latch 770. An output of latch 770 (labeled as q) serves as an input to buffer 780. In one example, an output of the buffer 780 may be the Power ON Reset (PoR) signal (e.g., por_out) 781.

Figure 8:
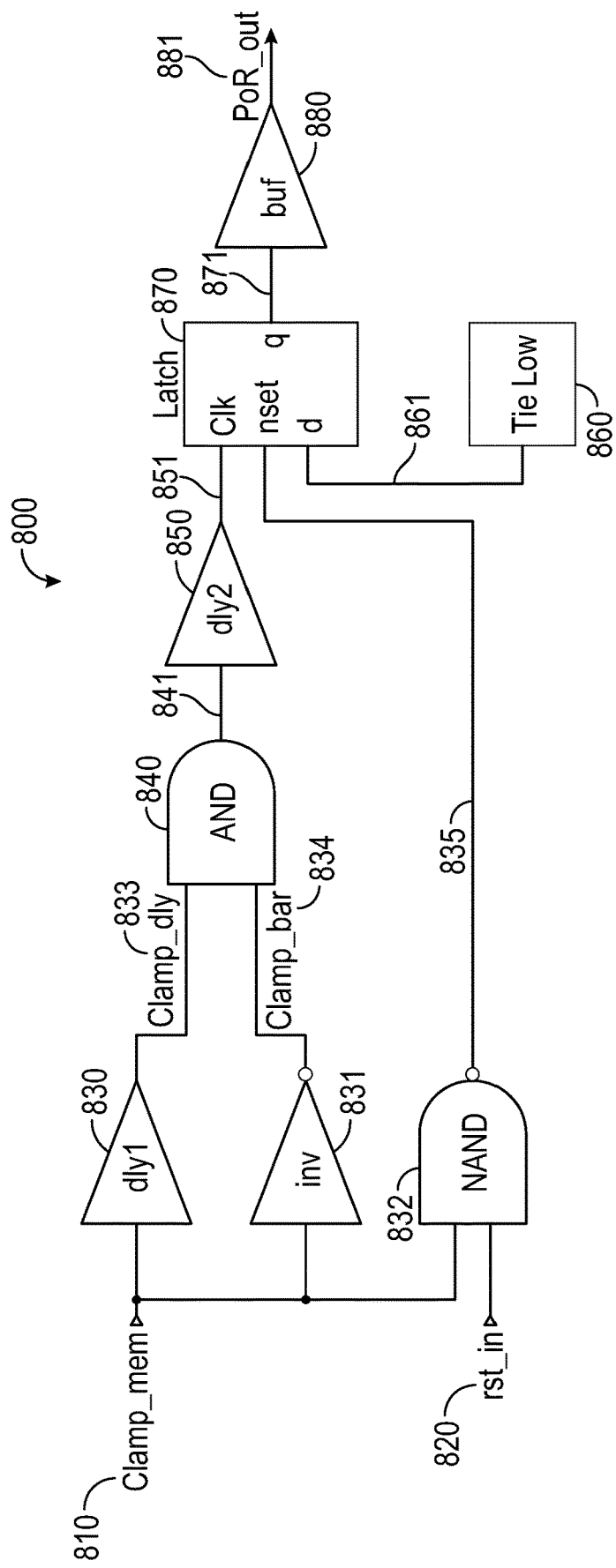
FIG. 8 illustrates a second example reset signal generation circuit in a system on a chip (SOC).

FIG. 8 illustrates a second example reset signal generation circuit 800 in a system on a chip (SOC). In one example, the SOC generates only a clamp control signal and a separate reset signal generation circuit is needed to generate the PoR signal from the clamp control signal. In one example, there is no race condition between de-assertion (i.e., transition to a LOW logic level) of the PoR signal and de-assertion of the clamp control signal such that a deterministic output may be guaranteed.

In one example, the clamp control signal (e.g., clamp_mem) 810 is sent as an input to a first delay element (labeled as dly1) 830, an input to inverter (e.g., inv) 831, and a first input to a NAND gate 832. In one example, a global reset signal (e.g., rst_in) 820 is sent as a second input to NAND gate 832. In one example, an output of the first delay element (e.g., dly1) 830 serves as a first input 833 (e.g., clamp_dly) to an AND gate 840 and an output of the inverter 831 (e.g., clamp_bar) serves as a second input 834 to the AND gate 840. In one example, an output 841 of the AND gate 840 is inputted to a second delay element (labeled as dly2) 850 and an output 851 of the second delay element 850 serves as a first input to latch 870. In one example, an output 835 of the NAND gate 832 serves as a second input to latch 870. In addition, an output 861 of a tie low module 860 serves as a third input to latch 870. In one example, the tie low module 860 produces a constant LOW logic level signal at the output 861.

In one example, the first input to latch 870 may serve as a clock input (labeled as clk) to latch 870. In one example, the second input to latch 870 may serve as a reset input (labeled as nset) to latch 870. In one example, the third input to latch 870 may serve as a signal input (labeled as d) to latch 870.

In one example, operation of latch 870 is such that the output 871 of latch 870 (labeled as q) has a logic level which is set to the logic level of the third input (labeled as d) of latch 870 when the first input of latch G70 (labeled as clk) transitions logic levels. In one example, the logic level transition is from a LOW logic level to a HIGH logic level, if triggered on a rising edge of the first input, or the logic level transition is from a HIGH logic level to a LOW logic level, if triggered on a falling edge of the first input. In addition, the output of latch 870 may be reset to a HIGH logic level when the second input of latch 870 is asserted (i.e., set to a HIGH logic level).

In one example, an output 871 of latch 870 (labeled as q) serves as an input to buffer (labeled as buf) 880. In one example, an output of buffer 880 may be a Power ON Reset (PoR) signal (e.g., por_out) 881. In one example, operation of the reset signal generation circuit proceeds as follows. First, a global reset signal (e.g., rst_in) 820 may be received to initialize the Power ON Reset (PoR) signal (e.g., por_out) 881 to a HIGH logic level. In one example, the global reset signal (e.g., rst_in) 820 is an external signal (i.e., generated outside of the SOC). Next, as the clamp control signal (e.g., clamp_mem) 810 is de-asserted (i.e., set to a LOW logic level), the reset signal generation circuit detects the clamp control signal (e.g., clamp_mem) 810 de-assertion and delays a PoR signal de-assertion (i.e., transition to a LOW logic level). In one example, the operation of the reset signal generation circuit prevents a race condition between the clamp control signal de-assertion and the PoR signal de-assertion. In one example, the reset signal generation circuit 800 is coupled to a clamp keeper cell (e.g., clamp keeper cell 400 or clamp keeper cell 500) to form a clamp keeper system.

Figure 9:
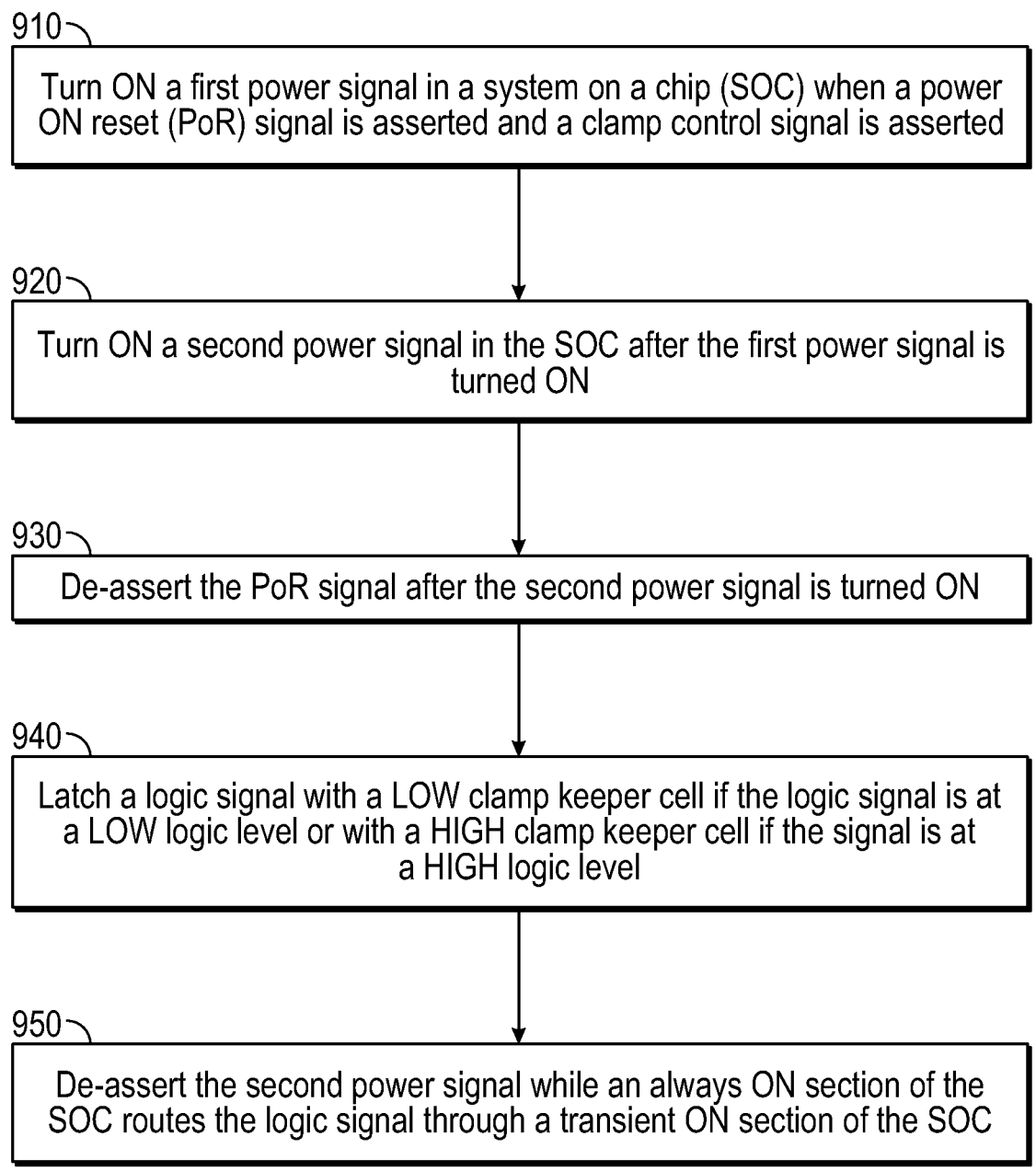
FIG. 9 illustrates an example flow diagram 900 for saving always on (AON) routing of signals across chips.

FIG. 9 illustrates an example flow diagram 900 for saving always on (AON) routing of signals across chips. In one example, the flow diagram illustrates steps for a SOC power rail initialization sequence with a clamp control signal and a power on reset (PoR) signal. In addition, the SOC power rail initialization sequence uses clamp keeper cells, which maintain signal state (i.e., HIGH or LOW) during sleep mode. For example, the clamp keeper cells are controlled by a clamp control signal which asserts (i.e., goes HIGH) when a transient ON section power rail is collapsed or when the transient ON section power rail is powering up. In addition, a cluster approach is used where interface macros convert signals from one section to another (e.g., from MX to CX, or vice versa).

In block 910, turn ON a first power signal in a system on a chip (SOC) when a Power ON Reset (PoR) signal is asserted and a clamp control signal is asserted. In one example, the first power signal is used in an always ON section of the SOC. In one example, the PoR signal is generated by a reset signal generation circuit based on the clamp control signal. In another example, a global reset signal is also inputted to the reset signal generation circuit to generate the PoR signal. In yet another example, a constant LOW logic level signal is also inputted to the reset signal generation circuit to generate the PoR signal.

In block 920, turn ON a second power signal in the SOC after the first power signal is turned ON, wherein the second power signal is placed in an asserted state. In one example, the second power signal is different from the first power signal. In one example, the second power signal is used in a transient ON section of the SOC.

In block 930, de-assert the PoR signal after the second power signal is turned ON. In one example, de-assert the PoR signal after a third power signal is turned ON. In one example, the third power signal is used in a transient ON section of the SOC. In one example, the third power signal is different from the second power signal and from the first power signal.

In block 940, latch a logic signal with a LOW clamp keeper cell if the logic signal is at a LOW logic level or with a HIGH clamp keeper cell if the signal is at a HIGH logic level. In one example, the logic signal is latched using the clamp control signal. In one example, the logic signal is at either a LOW logic level or a HIGH logic level at startup (e.g., first time power up) and is latched subsequent to startup.

In block 950, de-assert the second power signal while a first section of the SOC routes the logic signal through a second ON section of the SOC, wherein the second power signal is placed in a de-asserted state. In one example, the first section of the SOC is an always ON section. In one example, the second section of the SOC is a transient ON section. In one example, a logic level (e.g., LOW or HIGH) of the always ON section is preserved while the second power signal changes from an asserted state to a de-asserted state.

In one aspect, one or more of the steps for saving always on (AON) routing of signals across chips in FIG. 9 may be executed by one or more processors which may include hardware, software, firmware, etc. In one aspect, one or more of the steps in FIG. 9 may be executed by one or more processors which may include hardware, software, firmware, etc. The one or more processors, for example, may be used to execute software or firmware needed to perform the steps in the flow diagram of FIG. 9. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for saving always on (AON) routing of signals across chips. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for saving always on (AON) routing of signals across chips, the method comprising:
   turning ON a first power signal in a system on a chip (SOC) when a Power ON Reset (PoR) signal is asserted and a clamp control signal is asserted and wherein the PoR signal comprises the clamp control signal;
   turning ON a second power signal in the SOC after the first power signal is turned ON, wherein the second power signal is placed in an asserted state;
   de-asserting and delaying the PoR signal after the second power signal is turned ON;
   latching a logic signal with a LOW clamp keeper cell if the logic signal is at a LOW logic level or with a HIGH clamp keeper cell if the signal is at a HIGH logic level; and
   de-asserting the second power signal while a first section of the SOC routes the logic signal through a second section of the SOC, wherein the second power signal is placed in a de-asserted state in response to the latching the logic signal with the LOW clamp keeper cell if the logic signal is at the LOW logic level or with the HIGH clamp keeper cell if the signal is at the HIGH logic level.

2. The method of claim 1, wherein the first section of the SOC is an always ON section.

3. The method of claim 2, wherein the second section of the SOC is a transient ON section of the SOC.

4. The method of claim 1, wherein the de-asserting the PoR signal is implemented after a third power signal is turned ON, wherein the third power signal is different from the second power signal.

5. The method of claim 4, wherein the third power signal is used in a first transient ON section of the SOC.

6. The method of claim 5, wherein the second power signal is used in a second transient ON section of the SOC and wherein the second transient ON section is different from the first transient ON section.

7. The method of claim 6, wherein the first power signal is used in an always ON section of the SOC.

8. The method of claim 1, further comprising generating the PoR signal based on the clamp control signal.

9. The method of claim 8, further comprising generating the PoR signal based on a global reset signal.

10. The method of claim 8, further comprising generating the PoR signal based on a constant LOW logic level signal.

11. The method of claim 1, further comprising using the clamp control signal to latch the logic signal.

12. The method of claim 1, wherein the LOW logic level is preserved while the second power signal changes from the asserted state to the de-asserted state.

13. The method of claim 1, wherein the HIGH logic level is preserved while the second power signal changes from the asserted state to the de-asserted state.

14. A clamp keeper system, comprising:
   a clamp keeper cell, wherein the clamp keeper cell comprises a clamp keep latch and a logic function, wherein the clamp keep latch is coupled to the logic function; and
   a reset signal generation circuit coupled to the clamp keeper cell for generating a Power ON Reset (PoR) signal, wherein the PoR signal is a first input to the logic function and comprises a clamp control signal;
   wherein the reset signal generation circuit comprises a delay element to delay the PoR signal in response to latching a logic signal with a LOW clamp keeper cell if the logic signal is at a LOW logic level or with a HIGH clamp keeper cell if the signal is at a HIGH logic level.

15. The clamp keeper system of claim 14, wherein the clamp keep latch comprises an input for inputting the clamp control signal.

16. The clamp keeper system of claim 15, wherein the clamp keep latch comprises an output coupled to a second input to the logic function.

17. The clamp keeper system of claim 16, wherein the reset signal generation circuit comprises:
- a latch;
- a clock module for generating a clock signal for inputting to the latch, wherein the clock signal is based on the clamp control signal;
- an inversion module for generating an internal latch reset signal for inputting to the latch;
- a tie low module for generating a constant LOW logic level for inputting to the latch; and
- a buffer coupled to an output of the latch, wherein the buffer outputs the Power ON Reset (PoR) signal.

18. The clamp keeper system of claim 17, wherein the logic function is an OR logic function.

19. The clamp keeper system of claim 18, wherein an output of the clamp keeper cell is at a logic level of HIGH at an initialization interval.

20. The clamp keeper system of claim 17, wherein the logic function is a bubbled AND logic function.

21. The clamp keeper system of claim 20, wherein an output of the clamp keeper cell is at a logic level of LOW at an initialization interval.

22. An apparatus for saving always on (AON) routing of signals across chips, the apparatus comprising:
- means for turning ON a first power signal in a system on a chip (SOC) when a Power ON Reset (PoR) signal is asserted and a clamp control signal is asserted and wherein the PoR signal comprises the clamp control signal;
- means for turning ON a second power signal in the SOC after the first power signal is turned ON, wherein the second power signal is placed in an asserted state;
- means for de-asserting and delaying the PoR signal after the second power signal is turned ON;
- means for latching a logic signal with a LOW clamp keeper cell if the logic signal is at a LOW logic level or with a HIGH clamp keeper cell if the signal is at a HIGH logic level; and
- means for de-asserting the second power signal while a first section of the SOC routes the logic signal through a second section of the SOC, wherein the second power signal is placed in a de-asserted state in response to latching the logic signal with the LOW clamp keeper cell if the logic signal is at the LOW logic level or with the HIGH clamp keeper cell if the signal is at the HIGH logic level.

23. The apparatus of claim 22, wherein the first section of the SOC is an always ON section, and the second section of the SOC is a transient ON section of the SOC.

24. The apparatus of claim 23 further comprising means for turning ON a third power signal and wherein de-asserting the PoR signal is implemented after the third power signal is turned ON.

25. The apparatus of claim 24 further comprising means for generating the PoR signal based on the clamp control signal.

26. The apparatus of claim 25, wherein the means for generating the PoR signal also uses a global reset signal and a constant LOW logic level signal to generate the PoR signal.

27. The apparatus of claim 26 further comprising means for using the clamp control signal to latch the logic signal.

28. The apparatus of claim 27 further comprising means for preserving the LOW logic level while the second power signal changes from the asserted state to the de-asserted state.

29. The apparatus of claim 27 further comprising means for preserving the HIGH logic level while the second power signal changes from the asserted state to the de-asserted state.

30. A computer-readable medium storing computer executable code, operable on a device comprising at least one processor and at least one memory coupled to the at least one processor, wherein the at least one processor is configured to implement saving always on (AON) routing of signals across chips, the computer executable code comprising:
- instructions for causing a computer to turn ON a first power signal in a system on a chip (SOC) when a Power ON Reset (PoR) signal is asserted and a clamp control signal is asserted and wherein the PoR signal comprises the clamp control signal;
- instructions for causing the computer to turn ON a second power signal in the SOC after the first power signal is turned ON, wherein the second power signal is placed in an asserted state;
- instructions for causing the computer to de-assert and delay the PoR signal after the second power signal is turned ON;
- instructions for causing the computer to latch a logic signal with a LOW clamp keeper cell if the logic signal is at a LOW logic level or with a HIGH clamp keeper cell if the signal is at a HIGH logic level; and
- instructions for causing the computer to de-assert the second power signal while a first section of the SOC routes the logic signal through a second section of the SOC, wherein the second power signal is placed in a de-asserted state in response to latching the logic signal with the LOW clamp keeper cell if the logic signal is at the LOW logic level or with the HIGH clamp keeper cell if the signal is at the HIGH logic level.

* * * * *